United States Patent
Feit

(10) Patent No.: US 9,194,554 B2
(45) Date of Patent: Nov. 24, 2015

(54) LED LIGHTING FIXTURE ASSEMBLY

(71) Applicant: Feit Electric Company, Inc., Pico Rivera, CA (US)

(72) Inventor: Alan Feit, Encino, CA (US)

(73) Assignee: FEIT ELECTRIC COMPANY, INC., Pico Rivera, CA (US)

(*) Notice: Subject to any disclaimer, the term of this patent is extended or adjusted under 35 U.S.C. 154(b) by 208 days.

(21) Appl. No.: 13/832,712

(22) Filed: Mar. 15, 2013

(65) Prior Publication Data
US 2014/0268742 A1    Sep. 18, 2014

(51) Int. Cl.
| | |
|---|---|
| F21V 1/00 | (2006.01) |
| F21S 2/00 | (2006.01) |
| F21V 3/04 | (2006.01) |
| F21V 17/06 | (2006.01) |
| F21V 19/00 | (2006.01) |
| F21Y 101/02 | (2006.01) |

(52) U.S. Cl.
CPC ... F21V 1/00 (2013.01); F21S 2/00 (2013.01); F21V 3/0427 (2013.01); F21V 3/0445 (2013.01); F21V 17/06 (2013.01); F21V 19/001 (2013.01); *F21Y 2101/02* (2013.01)

(58) Field of Classification Search
CPC .......................................................... F21K 9/50
USPC .......................................................... 362/235
See application file for complete search history.

(56) References Cited

U.S. PATENT DOCUMENTS

| | | | |
|---|---|---|---|
| 7,063,441 B2 | 6/2006 | Kramer et al. | |
| 7,559,674 B2 | 7/2009 | He et al. | |
| 7,866,850 B2 | 1/2011 | Alexander et al. | |
| 8,246,204 B2 | 8/2012 | McCanless | |
| 8,253,310 B1 | 8/2012 | Xia | |
| 8,317,366 B2 | 11/2012 | Dalton et al. | |
| 2003/0011323 A1* | 1/2003 | Kirkpatrick et al. | 315/248 |
| 2011/0242815 A1* | 10/2011 | Markle et al. | 362/294 |
| 2012/0250302 A1 | 10/2012 | Edwards et al. | |
| 2012/0314407 A1 | 12/2012 | Souvay | |
| 2013/0058087 A1* | 3/2013 | Chang | 362/249.02 |

* cited by examiner

*Primary Examiner* — Anh Mai
*Assistant Examiner* — Hana Featherly
(74) *Attorney, Agent, or Firm* — Alston & Bird LLP

(57) ABSTRACT

Various embodiments of the present invention provide a light emitting diode (LED) lighting fixture and methods of installing the same. In various embodiments, an LED lighting fixture may comprise: at least one socket comprising a socket opening; at least one LED positioned substantially within the socket opening; at least one shield member positioned adjacent the at least one socket such that the shield substantially encloses the socket opening; at least one decorative light shade; at least one cover comprising a neck portion having an internal surface, the internal surface defining a cover opening. The cover opening is configured to receive there-through at least a portion of a socket and substantially engage the socket. At least a portion of the cover is configured to substantially engage the decorative light shade. Also, at least a portion of the cover is configured to substantially enclose the LED and shield.

25 Claims, 8 Drawing Sheets

LED LIGHTING FIXTURE ASSEMBLY

BACKGROUND

Incandescent bulbs are slowly being phased out in favor of more efficient lighting sources. This has led to an increased use of compact fluorescent bulbs which are more efficient than incandescent bulbs, but which tend to contain dangerous gasses, such as mercury. Additionally, many people find the color temperature of light emitted by compact fluorescents to not be aesthetically pleasing for many applications, such as household lighting in kitchens, bathrooms, and living rooms; some commercial applications; and the like.

Recent advances in manufacturing light emitting diodes (LEDs) combined with the efficiency and long lifetime of LEDs have led to an increase in the availability and affordability of LED lamps. LED lamps offer advantages over compact fluorescent bulbs including longer lifetime and the absence of dangerous gasses. Also, LED lamps may be configured to emit light at a wide variety of color temperatures.

Both incandescent bulbs and compact fluorescent bulbs must be designed to maintain a specific environment within the bulb (e.g., a vacuum or a specific mix of gasses). LEDs, by contrast, can function under regular atmospheric conditions. However, because LEDs are small, solid state devices, LED lamps generally utilize board mounted LEDs. Therefore, the electrical components of an LED lamp may be exposed, providing a possible safety hazard.

Thus, there is a need for LED lighting fixtures which are safe for household and commercial uses. Additionally, there is a need for aesthetically pleasing LED lighting fixtures.

BRIEF SUMMARY

The present invention provides a safe, simple, and aesthetically pleasing lighting fixture assembly that utilizes a plurality of LEDs as the light source.

In various embodiments, the lighting fixture assembly comprises a fixture mounting which can be mounted on a wall or ceiling or other surface or can be configured to rest upon a desk or table or the floor, or the like. In other various embodiments, the lighting fixture may be configured to be held in a user's hand. In various embodiments, the fixture mounting may contain at least one socket that may have at least one LED mounted within the at least one socket. In various embodiments, a shield may enclose the at least one LED into the socket and may electrically and/or physically isolate the at least one LED from the user. In various embodiments, the lighting fixture assembly may further comprise at least one decorative light shade. The at least one decorative light shade may have an opening disposed within the decorative light shade that may be configured such that the light shade can be slid onto the socket. In other embodiments, the decorative light shade may be configured to workably connect to the socket by other mechanisms. In various embodiments, the lighting fixture may also comprise at least one cover member which may be configured to rotationally connect to the at least one socket; therefore locking the at least one decorative light shade onto the at least one socket. The at least one cover may also be configured to disperse the light emitted from the one or more LEDs mounted within the at least one socket. Thus, to a user viewing the lighting fixture, it may appear that the light source is suspended within the at least one decorative light shade rather than mounted within the at least one socket.

In various embodiments, an LED lighting fixture is provided. In such embodiments, the LED lighting fixture may comprise: at least one socket comprising a peripheral wall, the peripheral wall having an external surface and an internal surface, the internal surface defining a socket opening; at least one LED positioned substantially within an interior of the socket opening; at least one shield member positioned adjacent the at least one socket such that a perimeter of the at least one shield member is positioned adjacent the peripheral wall so as to substantially enclose the socket opening; at least one decorative light shade; at least one cover comprising a neck portion having an external surface and an internal surface, the internal surface defining a cover opening, wherein: the cover opening is configured to receive there-through at least a portion of the at least one socket, such that the internal surface of the neck portion substantially engages the external surface of the peripheral wall; at least a portion of the cover is configured to substantially engage the decorative light shade; and at least a portion of the cover is configured to substantially enclose the at least one LED and the at least one shield member.

In other embodiments, an LED lighting fixture is provided comprising: at least one socket comprising a socket opening defining an interior socket chamber of the at least one socket; at least one LED substantially positioned with the interior socket chamber; at least one shield substantially secured within the interior socket chamber such that the at least one LED is substantially enclosed within the interior socket chamber by the shield; and at least one cover comprising a cover opening, the cover opening defining an interior cover chamber of the at least one cover, the at least one cover being operatively mounted to the at least one socket such that at least one of the LEDs and at least one of the shields are positioned within at least a portion of the interior cover chamber opening.

In still other embodiments, a vanity lighting fixture is provided, comprising: two or more sockets each comprising a first opening defining an interior chamber of each of the two or more sockets; two or more LEDs wherein at least one LED is positioned within the interior chamber of each of the two or more sockets; two or more shields wherein each shield is positioned within the interior chamber of one of the two or more sockets such that the at least one LED is enclosed within the first chamber by the shield; two or more covers each comprising a second opening defining an interior chamber of each of the two or more covers, the two or more covers each secured to one of the two or more sockets such that the at least one LED positioned within the one of two or more sockets is positioned within the second opening of one of the covers; and two or more decorative light shades wherein each decorative light shade is secured to one of the two or more sockets via one of the two or more covers.

In another aspect of the present invention, a method of installing an LED lighting fixture is provided, the method comprising the steps of: providing an LED lighting fixture comprising at least one socket comprising a first opening; mounting or placing the lighting fixture on an appropriate surface; sliding a light shade onto at least one of the at least one socket of the lighting fixture; operatively mounting a cover onto the at least one socket wherein mounting the cover secures the light shade to the at least one socket.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
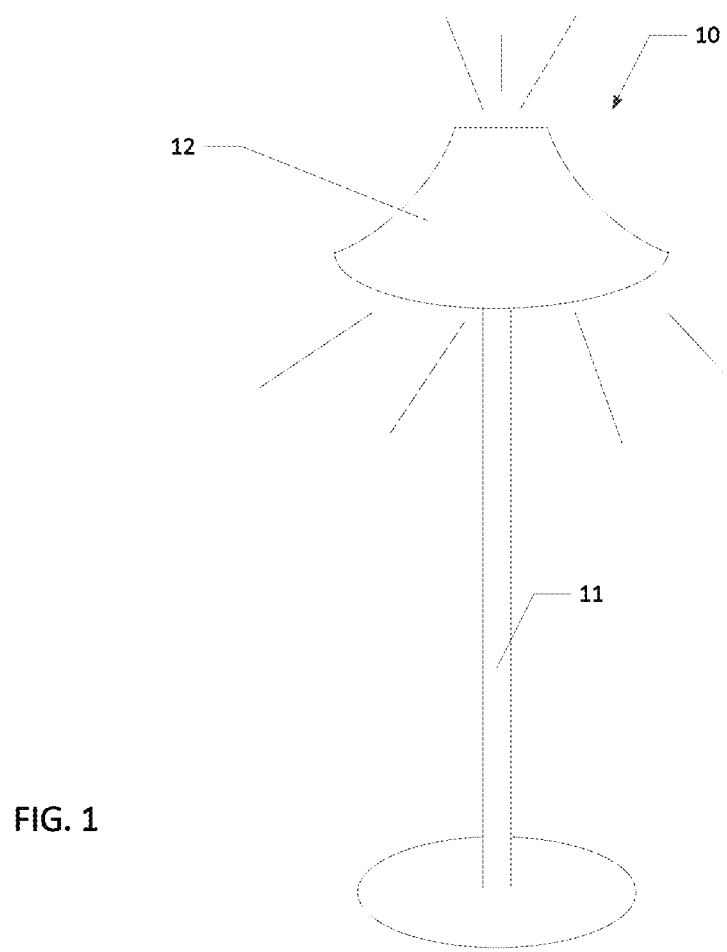
FIG. 1 is a side view of an assembled lighting fixture, according to various embodiments of the present invention.
Figure 4:
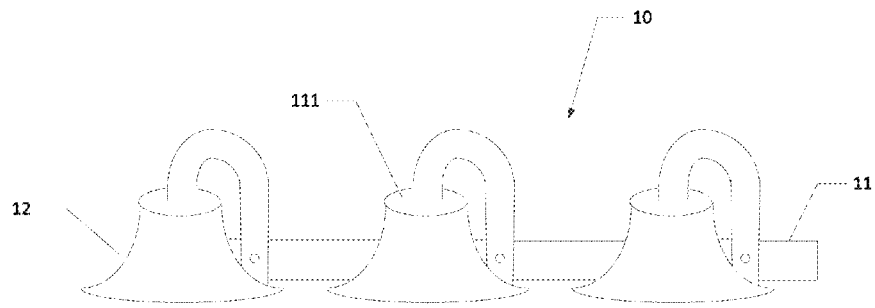
FIG. 4 is a side view of an assembled lighting fixture, according to various light embodiments of the present invention.
Figure 5:
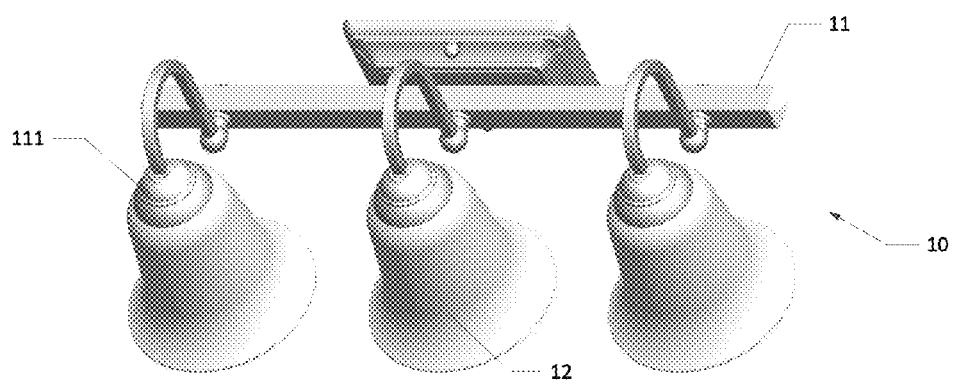
FIG. 5 is a top view of an assembled lighting fixture, according to various embodiments of the present invention.

FIGS. 1, 4, and 5 show various embodiments of assembled lighting fixtures 10, according to various embodiments of the present invention. FIG. 1 illustrates at least one embodiment of a floor lamp style lighting fixture 10. FIGS. 4 and 5 illustrate various embodiments of a wall style lighting fixture 10. In some embodiments, when the lighting fixture 10 is assembled, the visible components comprise at least one fixture mounting 11 and at least one decorative light shade 12.

Figure 2:
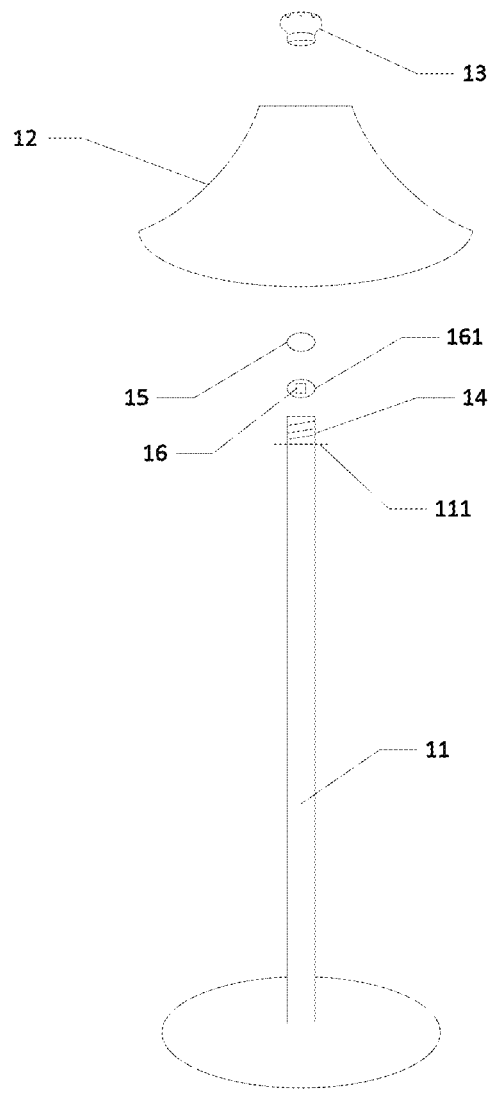
FIG. 2 is an exploded side view of the lighting fixture illustrated in FIG. 1.
Figure 6:
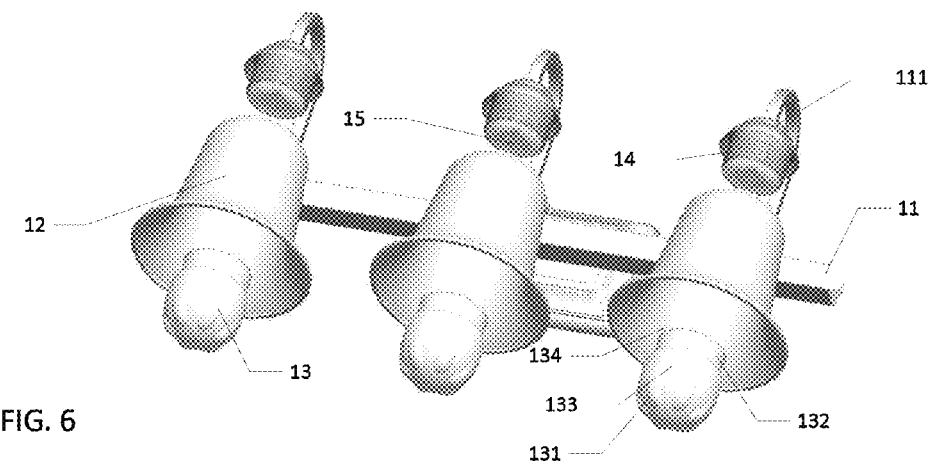
FIG. 6 is an exploded view of the lighting fixture illustrated in FIG. 5.
Figure 7:
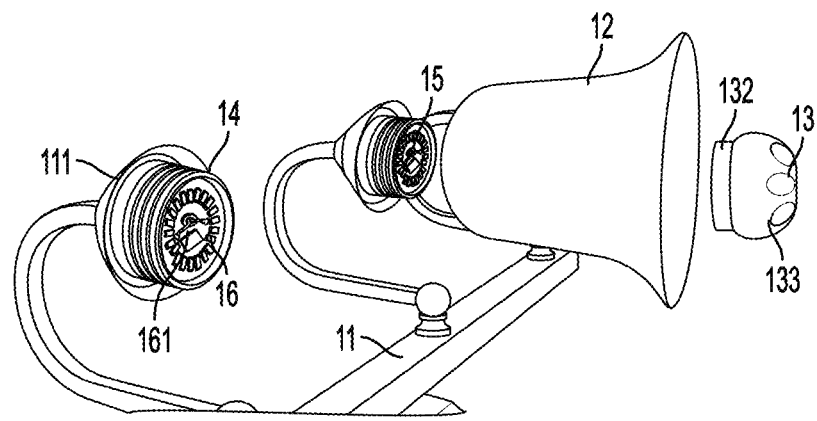
FIG. 7 is an exploded perspective view of part of a lighting fixture, according to various embodiments of the present invention.
Figure 8:
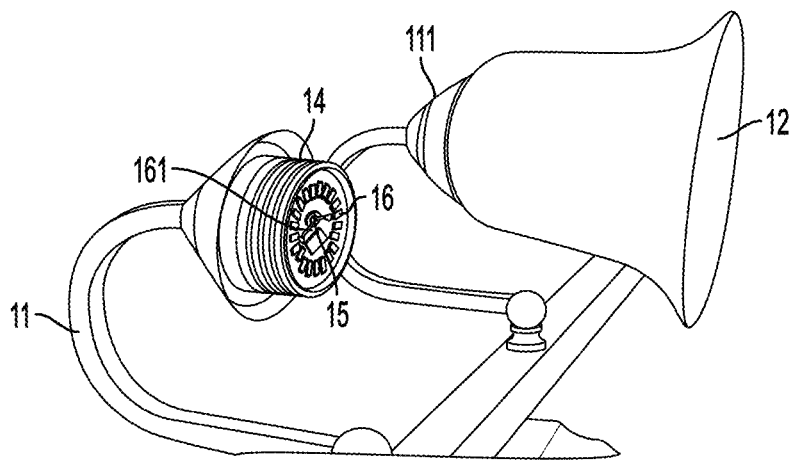
FIG. 8 is perspective view of part of a lighting fixture, according to various embodiments of the present invention.
Figure 9:
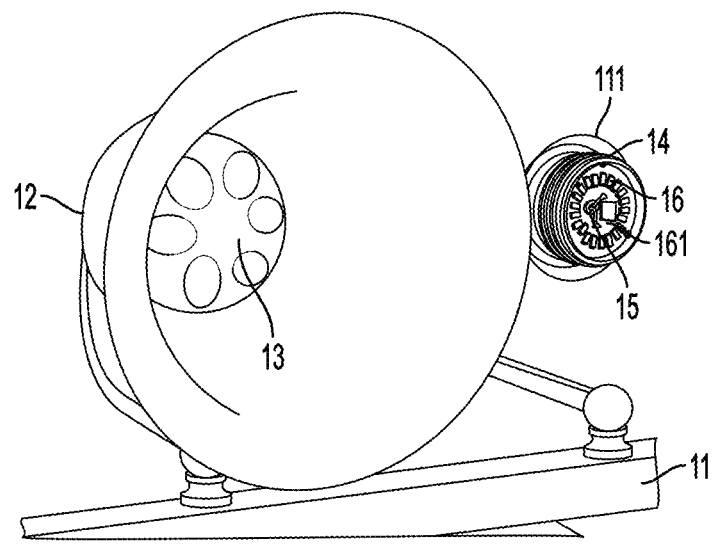
FIG. 9 is a different perspective view of part of a lighting fixture, according to various embodiments of the present invention.
Figure 10:
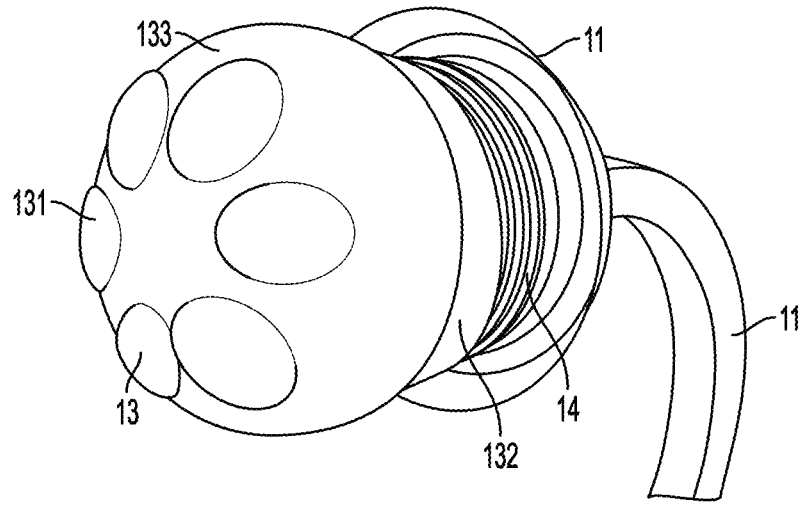
FIG. 10 is a perspective view of a cover secured to a socket, according to various embodiments of the present invention.
Figure 11:
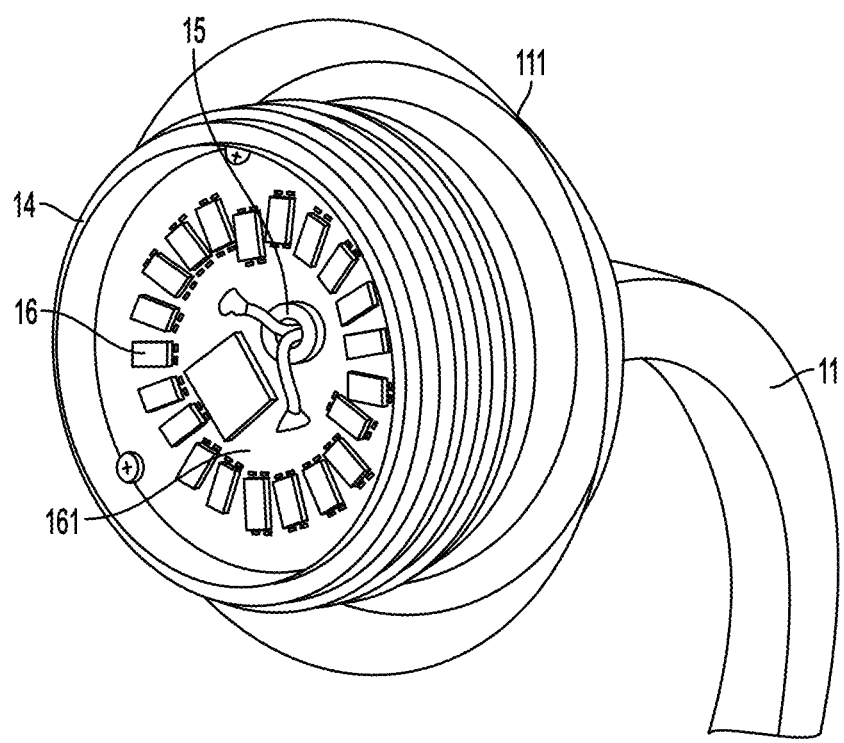
FIG. 11 is a perspective view of a socket attached to a fixture mounting, according to various embodiments of the present invention.

FIGS. 2, 6, and 7 show exploded views of various embodiments of a lighting fixture 10. FIG. 2 is an exploded view of various embodiments of the at least one embodiment illustrated in FIG. 1. As shown in FIG. 2, in various embodiments, a single socket 14 is affixed on top of the fixture mounting 11. In various embodiments, at least one LED 16 may be mounted on a board 161. In various embodiments the at least one LED 16 may be inserted into the socket 14. In some such embodiments the at least one LED 16 may be workably connected to an electric power source. A shield 15 may be secured into the socket 14 on top of the at least one LED 16. In various embodiments, the shield 15 may be secured such that the outer surface of shield 15 is flush with the opening in socket 14. In other embodiments, the shield 15 may be secured into socket 14 such that outer surface of the shield 15 is recessed into the socket 14. In various embodiments, the outer or inner surface of socket 14 may be threaded. In these embodiments, the cover 13 may be configured with the mating threads and thus can be secured to the socket 14 via a proper mating of the threads. In other embodiments, the outer or inner surface of a socket 14 may have other means for securing cover 13. In various embodiments, the cover 13 may act as a light extender to move the light emitted by the at least one LED 16 out into the decorative light shade 12 and thus providing an appearance that resembles an incandescent light bulb. Components of various embodiments of the lighting fixture 10 will now be discussed in detail.

Structural Features of Various Embodiments

1. Fixture Mounting 11

Remaining with FIG. 2, in various embodiments, the fixture mounting 11 may provide the structural support for the lighting fixture 10. In various embodiments, the fixture mounting 11 may be configured to be placed on a desk, table, floor, or other surface, whether removably or otherwise. In certain embodiments, the fixture mounting 11 may be configured to be permanently mounted on a wall, ceiling, or other surface. In other embodiments, the fixture mounting 11 may be configured to be mounted in a selectively removable manner on a wall, ceiling, or other surface. Non-limiting examples of wall or ceiling-mounted lighting fixtures according to various embodiments comprise vanity fixtures, wall sconces, and overhead lighting fixtures. In still other embodiments, the fixture mounting 11 may be configured such that a user can choose whether to mount the lighting fixture 10 or to place the lighting fixture 10 on a surface. In yet other embodiments, the lighting fixture 10 may be configured to be held in the user's hand.

In various embodiments, the fixture mounting 11 may be made out of plastic. In other embodiments, the fixture mounting may be made out of metal or any other suitable material.

In various embodiments, the fixture mounting 11 may comprise the appropriate wiring for lighting fixture 10 to be operated via batteries or some other portable electric power source. In various such embodiments, the fixture mounting 11 may comprise a compartment that may be concealed within the fixture mounting 11 in which the batteries may be mechanically mounted within the fixture mounting 11. This compartment may also comprise a mechanism to electrically connect the batteries to the electrical components of the lighting fixture 10.

In various embodiments, the fixture mounting 11 may include an electrical cord that is workably connected to the electrical components of the lighting fixture 10. In various such embodiments, a plug configured for being plugged into an electrical socket may be disposed on one end of the electrical cord. In such embodiments, the electrical cord may be disposed in a base of the lighting fixture 10 or a different location on the lighting fixture 10. In various embodiments, a set of electrical wires may be used rather than a single electrical cord. In other embodiments, the electrical cord or wires may be configured such that the lighting fixture 10 may be directly connected to line voltage. In various such embodiments, the electrical cord or wires may be disposed on the mounting surface of the fixture mounting 11.

In various embodiments, the fixture mounting 11 may further comprise a power switch workably connected to the lighting fixture 10. A wide variety of power switches are commonly known and well understood in the art. A few non-limiting examples of power switches which may be employed in various embodiments comprise chain pull switches, touch activated switches, "clap-on" switches, rotationally activated switches, slide activated switches, and the like. In various embodiments, the fixture mounting 11 does not include a power switch. In some such embodiments, the flow of electrical power to the lighting fixture 10 may be controlled through a wall mounted power switch, by plugging and unplugging an electrical cord from an electrical socket, or by other mechanisms.

Of course, it should be understood that, in various embodiments, fixture mounting 11 may have any of a variety of configurations, as such are commonly known and understood in the art, without departing from the scope of the invention.

2. Socket 14

Still remaining with FIG. 2, in various embodiments, lighting fixture 10 may further comprise at least one socket 14. In various embodiments, the at least one socket 14 may provide structural and electrical support for at least one LED 16. In such embodiments, the at least one LED 16 may be mounted within a socket 14 as will be discussed below. A socket 14 may also provide a mechanism to secure a decorative light shade 12 and/or a cover 13 in various embodiments, as detailed below.

In various embodiments, the at least one socket 14 may be generally circular or elliptical in cross-section. In other embodiments, the at least one socket 14 may be generally rectangular or alternatively shaped in cross-section. In various embodiments, the cross-section of the at least on socket 14 may not be the same at all points along the length of the at least one socket 14. For example, in at least one embodiment, with a generally circular cross-section, the cross-section may have a different diameter at one point along the length of the at least one socket 14 than at another point along the length of the same socket 14.

In various embodiments, the at least one socket 14 may be less than a quarter of an inch in diameter. In other embodiments, the at least one socket 14 may be less than an inch in diameter. In some embodiments, the at least one socket 14 may be one to three inches in diameter. In other embodiments, the at least one socket 14 may be larger than three inches in diameter. In various embodiments, the opening in socket 14 may be less than a quarter of an inch deep. In other embodiments, the opening in socket 14 may be a quarter of an inch to half an inch deep. In still other embodiments, the opening in socket 14 may be half an inch to an inch deep. In yet other embodiments, the opening in socket 14 may be deeper than one inch.

The at least one socket 14 may be mechanically connected to fixture mounting 11, in various embodiments. In some embodiments, the at least one socket 14 may be molded out of the same material as the fixture mounting 11. In some embodiments, the at least one socket 14 may be co-molded with fixture mounting 11. In other embodiments, the at least one socket 14 may be made out of a material different from fixture mounting 11. In various such embodiments, the at least one socket 14 may be made out of aluminum or plastic. In other such embodiments, the at least one socket 14 may be made out of any suitable material. In some embodiments, the at least one socket 14 may be made by a method which is not molding.

In various embodiments, at least a portion of the outer and/or inner surface of the at least one socket 14 may be threaded. In these embodiments, the threads may be configured to engage with threads which may be present on the cover 13. In other such embodiments, the threads may be configured to engage with threads on the decorative light shade 12. In various embodiments, the outer and/or inner surface of the at least one socket 14 may not be threaded. In various such embodiments, the outer and/or inner surface of the at least one socket 14 may be smooth or include other mechanisms which may be used to secure the decorative light shade 12 and the cover 13 to the lighting fixture 10. It should be appreciated that a variety of mechanisms are well known and understood in the art that may be used to operatively mount a cover 13 onto a socket 14 (or vice-versa) without departing from the scope of the present invention. Of course, it should also be understood that various alternatives to even incorporating a socket 14 at all may be employed in still other embodiments, as may be commonly known and used in the art.

In various embodiments, such as those illustrated in FIGS. 6-9, the lighting fixture 10 may comprise more than one socket 14. Various embodiments may comprise two, three, four or more sockets 14. In various such embodiments, at least one LED 16 may be secured in each socket 14, wherein the at least one LED 16 may be workably connected to an electric power source. In some such embodiments, a shield 15 may be mounted in each socket 14 to electrically isolate the user from the at least one LED 16 mounted within each socket 14. A decorative light shade 12 may be secured to each socket 14, in some embodiments. In other embodiments, one or more light shades 12 may be configured such that one decorative light shade 12 may correspond to more than one socket 14. One non-limiting example of at least one such embodiment may be that a light shade 12 is configured to be secured to two sockets 14. In various embodiments, a cover 13 is secured to each socket 14. In other various embodiments, a cover 13 may be configured to be secured to more than one socket 14. A non-limiting example may be if a light shade 12 is configured to be secured to two sockets 14, a cover 13 may also be configured to be secured to two sockets 14.

3. Light Shade Seat 111

Returning to FIG. 2, located at or near the base of the at least one socket 14, in various embodiments, there may be a light shade seat 111. In certain embodiments, the light shade 111 seat may be engaged by the decorative light shade 12, as will be described in further detail elsewhere herein. Of course, in other embodiments, the light shade seat 111 may merely serve a decorative function, as may be desirable for particular applications.

In various embodiments, the light shade seat 111 is generally circular or elliptical. In other embodiments, the light shade seat 111 may be generally rectangular or alternatively shaped. In certain embodiments, the light shade seat 111 may comprise one or more prongs. In at least one embodiment, the light shade seat 111 may comprise three prongs which are evenly spaced around the circumference of the socket 14. In other embodiments, the light shade seat 111 may be generally semi-circular or semi-elliptical. In various such embodiments, the light shade seat 111 may comprise a half or a third of a circle or ellipse. In other such embodiments, the light shade seat 111 may comprise two portions of a circle which are disposed at different points around a circumference of the socket 14. As will be appreciated, a number of other shapes are possible for the light shade seat 111 in keeping with various embodiments of the lighting fixture 10.

In various embodiments, the diameter of a light shade seat 111 is only an eighth of an inch larger than the diameter of the at least one socket 14. In other embodiments, the diameter of the light shade seat 111 is an eighth to a quarter of an inch larger than the diameter of the at least one socket 14. In still other embodiments, the diameter of the light shade seat 111 is a quarter to three-quarters of an inch larger than the diameter of the at least one socket 14. In yet other embodiments, the diameter of the light shade seat 111 is three-quarters of an inch to an inch and a half larger than the diameter of the at least one socket 14. In certain embodiments, the diameter of the light shade seat 111 is an inch and a half to three inches larger than the diameter of the at least one socket 14. In certain other embodiments, the diameter of the light shade seat 111 maybe larger than three inches larger than the diameter of the at least one socket 14.

In various embodiments, the one or more light shade seats 111 are made out of the same material as the fixture mounting 11. In various such embodiments, the one or more light shade seats 111 may be a different color or include a different finish than the fixture mounting 11. In other such embodiments, the color or finish of the one or more light shade seats is the same as the fixture mounting 11. In other embodiments, the one or more light shade seats 111 may be made of any appropriate material, including a material different from the fixture mounting 11.

In some embodiments, a light shade seat may be mounted at some point along the length of the at least one socket 14. In certain embodiments, the light shade seat 111 may be mounted half way along the length of the at least one socket 14. In other embodiments, the light shade seat 111 may be mounted on the fixture mounting 11 below the at least one socket 14. In some embodiments, the at least one socket 14 may be mounted in the middle of the light shade seat 111. Other embodiments may not include a light shade seat 111.

In various embodiments, decorative light shade 12 may rest upon or against light shade seat 111 when light shade 12 is slid or secured onto the socket 14. In other embodiments, light shade seat 111 may not be used to mechanically hold the light shade 12 in an appropriate position and may be included for aesthetic purposes only. Some embodiments may not include a light shade seat 111.

In various embodiments, a light shade seat 111 may be planar in nature. In other embodiments, a light shade seat 111 may have a concave curvature. In still other embodiments, a light shade seat 111 may be convex in curvature. In certain embodiments, a light shade seat 111 may comprise portions which are convex, concave, and/or planar in curvature. In various embodiments, the curvature of the light shade seat 111 may be chosen as appropriate for various applications.

As noted above and illustrated in FIGS. 4-9, in various embodiments, more than one socket 14 may be present. In various such embodiments, more than one light shade seat 111 may also be present. In some such embodiments, each light shade seat 111 may be associated with a single socket 14. In other various such embodiments, one or more light shade seats 111 may be associated with more than one socket 14. Of course, it should be understood that any of a variety of alternatives to a light shade seat 111 may be employed, as commonly known and understood in the art, without departing from the scope of the present invention.

4. Light Emitting Diode (LED) 16

Again returning to FIG. 2, in various embodiments, at least one LED 16 may be secured in the at least one socket 14. Any circuitry necessary to operate the one or more LEDs 16 may be mounted within the fixture mounting 11 or socket 14 according to various embodiments. In various embodiments, the at least one LED 16 may be an alternating current (AC) driven LED. In other embodiments, the at least one LED 16 may be a direct current (DC) driven LED. In some embodiments, no driver circuitry is necessary to operate the one or more LEDs 16. In other embodiments, one driver circuit may operate all the LEDs 16 present in lighting fixture 10. In still other embodiments, multiple driver circuits may be used to operate the one or more LEDs 16. In some such embodiments a driver circuit may be mounted in each socket 14.

In various embodiments, the driver circuit (not shown) may comprise a circuit portion configured to convert AC voltage into DC voltage. In some embodiments, the driver circuit may comprise a circuit portion configured to control the current flowing through the one or more LEDs 16. In certain embodiments, the driver circuit may comprise a circuit portion configured to dim the lighting fixture 10. In various embodiments, additional circuit components may be present in the driver circuitry. Similarly, in various embodiments, all or some of the circuit portions mentioned here may not be present in the driver circuit. In some embodiments, circuit portions listed herein as separate circuit portions may be combined into one circuit portion. As should be appreciated, a variety of driver circuitry configurations are generally known and understood in the art and any of such may be employed in various embodiments as suitable for the intended application, without departing from the scope of the present invention.

The at least one LED 16 may be of various color temperatures or various colors. In various embodiments, the at least one LED 16 may be white LEDs. In other embodiments, at least one of the at least one LEDs 16 may be a colored LED, such as a red, blue, green, or other colored LED. In various embodiments, different LEDs 16 secured within the same socket 14 may have different color temperatures. In other embodiments, all LEDs 16 in the lighting fixture 10 are designed to have approximately the same color temperature. In still other embodiments, the at least one LED 16 mounted in one socket 14 may be a different color temperature than the at least one LED 16 mounted in a different socket 14. For each embodiment, the color temperature of the one or more LEDs 16 may be chosen as appropriate for the expected use of lighting fixture 10.

In various embodiments, the at least one LED 16 may be mounted on a board 161 by any suitable method commonly known and understood in the art. In some such embodiments, any driver circuitry present may also be mounted on the board 161. In some embodiments, 21 or more LEDs may be mounted on a board 161. In other embodiments, no more than 5 LEDs are mounted on a board 161. In other embodiments, six to fifteen LEDs 16 may be mounted on a board 161. In yet other embodiments, sixteen to twenty LEDs 16 may be mounted on a board 161.

In various embodiments, the board 161 may be made of a reflective material. In other embodiments, the board 161 may be coated with a reflective material. Therefore, at least some portion of the light emitted from the at least one LED 16 in the direction of the board 161 or light that has been reflected back at the board 161 will be reflected off of the board 161.

In various embodiments, a board 161 is secured into a socket 14. In various such embodiments, at least one LED 16 is mounted on board 161. In various embodiments, driver circuitry may also be mounted to the board 161. In some such embodiments, the driver circuitry may be mounted on the opposite side of the board 161 than the side on which the at least one LED 16 is mounted. In various embodiments, the board 161 may be mounted into socket 14 via one or more set screws. In some embodiments, the board 161 may be closed into the socket 14 by securing a shield 15 on top of the at least one LED 16 and board 161 in the socket 14. In other embodiments, the board 161 may be mounted into socket 14 via an appropriate adhesive. In yet other embodiments, the board 161 may be mounted into socket 14 by other suitable mechanisms.

As discussed above and as illustrated in FIGS. 4-9, various embodiments may comprise two or more sockets 14. In various such embodiments, a board 161 may be mounted into each socket 14, at least one socket 14, or none of the sockets 14. In some such embodiments, at least one LED 16 is mounted on each board 161. In various embodiments, at least one LED 16 may be operatively mounted in each socket 14, as may be desirable for particular applications.

5. Shield 15

Returning to FIG. 2, in various embodiments, a shield 15 may be secured within the socket 14 on top of the at least one LED 16 that may be secured into a socket 14. In various embodiments, the shield 15 may be used to secure the at least one LED 16 into socket 14. In some embodiments, the shield 15 may be used to electrically and/or physically isolate the user from the electrical components of the lighting fixture 10. In various such embodiments, the shield 15 may be used to meet various safety standards such as UL Standards or other standards governing the lighting industry or otherwise, as may be necessary for particular applications.

In various embodiments, the shield 15 may be planar, convex, or concave, as suitable for various applications. In various embodiments, the shield 15 may be generally circular or elliptical. In other embodiments, the shield 15 may be generally rectangular or alternatively shaped. In some embodiments, the shield 15 may have the same shape as the cross section of the socket 14. In other embodiments, the shape of the shield 15 may be different than the cross-section of the socket 14.

In various embodiments, the shield 15 may have a diameter that is substantially the same as the inner diameter of the socket 14. In other embodiments, the shield 15 may have a diameter which is larger than the diameter of the socket 14. In various such embodiments, the diameter of the shield 15 may be small enough that the shield 15 does not prevent the decorative light shade 12 and/or the cover 13 from being secured to the socket 14. In still other embodiments, the diameter of the shield 15 may be smaller than that of the socket 14. In yet other embodiments, a lighting fixture 10 may not comprise a shield 15.

In various embodiments, the shield 15 is configured such that at least some portion of the light emitted by the at least one LED 16 may pass through the shield 15. In certain embodiments, the shield 15 may be configured such that at least 10% of the light emitted by the at least one LED 16 passes through the shield 15. In some embodiments, the shield 15 is configured such that at least a significant fraction of the light emitted by the at least one LED 16 passes through the shield 15. In certain embodiments, the shield 15 may be configured such that at least 40%, 50%, or 60% of the light emitted by the at least one LED 16 pass through the shield 15. In some embodiments, the shield 15 is configured such that nearly all of the light emitted by the at least one LED 16 passes through the shield 15. In certain embodiments, the shield 15 may be configured such that at least 80% or 90% of the light emitted by the at least one LED 16 passes through the shield 15. In various embodiments the shield 15 may be configured such that a fraction of the light emitted by the at least one LED 16 that is appropriate for the application passes through the shield 15.

In various embodiments, the shield 15 may be made from a polymerized material, as commonly known and understood in the art. In certain embodiments, the shield 15 may be made of plastic. In other embodiments, the shield 15 may be made out of any appropriate translucent or semi-translucent material. In certain embodiments, the shield 15 may be made out of an opaque material, if suitable for the application.

In various embodiments, the shield 15 is an electrical insulator. In these embodiments, the shield 15 may be configured to electrically and/or physically isolate the at least one LED 16 such that a user cannot come into contact with the at least one LED 16 or other electrical components of lighting fixture 10 while the user is using the lighting fixture 10. Thus, in these embodiments, the shield 15 may be used to meet various safety standards for consumer products, such as the UL Standards and other pertinent safety standards. In various such embodiments, the shield 15 may be made out of plastic or some other suitable electrically insulating material. In some such embodiments, the electrically insulating material used to make the shield 15 may be translucent or semi-translucent.

In various embodiments, the translucent or semi-translucent material may be configured to permit at least a portion of the light emitted by the at least one LED 16 to pass through the shield 15. For example, in certain embodiments, the translucent or semi-translucent material may be configured to permit at least 10% or 25% of the light emitted by the at least one LED 16 to pass through the shield 15. In various embodiments, the translucent or semi-translucent material may be configured to permit a significant fraction of the light emitted by the at least one LED 16 to pass through the shield 15. For example, in certain embodiments, the translucent or semi-translucent material may be configured to permit at least 40%, 50%, or 60% of the light emitted by the at least one LED 16 to pass through the shield 15. In other various embodiments, the translucent or semi-translucent material may be configured to permit substantially all of the light emitted by the at least one LED 16 to pass through the shield 15. For example, in certain embodiments, the translucent or semi-translucent material may be configured to permit at least 80% or 90% of the light emitted by the at least one LED 16 to pass through the shield 15.

In various embodiments, the shield 15 may be secured into or onto socket 14 via one or more set screws. In other embodiments, the shield 15 may be secured into or onto socket 14 via a suitable adhesive. In still other embodiments, the shield 15 may be secured into or onto socket 14 by other suitable mechanisms.

In various embodiments, the shield 15 may be secured into or onto socket 14 such that the shield 15 rests on top of socket 14. In other embodiments, the shield 15 may be secured into or onto socket 14 such that the outer surface of the shield 15 is substantially flush with the top of the socket 14. In yet other embodiments, the shield 15 may be secured into or onto socket 14 such that the outer surface of shield 15 is recessed within socket 14.

In various embodiments, the shield 15 may be mounted into or onto socket 14 such that an inch or more of space exists between the shield 15 and the top of the at least one LED 16 secured in socket 14. In other embodiments, the shield 15 may be mounted into or onto socket 14 such that a quarter of an inch to an inch of space exists between the bottom of the shield 15 and the top of the at least one LED 16 secured in socket 14. In still other embodiments, the shield may be mounted into or onto socket 14 such that an eighth to a quarter of an inch of space separates the bottom of the shield 15 and the top of the at least one LED 16. In yet other embodiments, less than an eighth of an inch separates the bottom of the shield 15 from the top of the at least one LED 16. In certain embodiments, the shield 15 rests on top of the at least one LED 16.

As previously described herein and as illustrated in FIGS. 4-9, various embodiments of lighting fixture 10 may include more than one socket 14. In various such embodiments, a shield 15 may be secured into or onto each socket 14. In some embodiments, a shield 15 may be secured into or onto at least one socket 14. In other embodiments, no shields 15 may be used. In various embodiments, a shield 15 may be configured to correspond to one socket 14. In other embodiments, a shield 15 may be configured to correspond to more than one socket 14. In some such embodiments, the shield 15 is configured such that the shield 15 that corresponds to more than one socket 14 does not prevent one or more decorative light shades 12 and/or covers 13 from being secured to the more than one socket 14.

6. Decorative Light Shade 12

Again returning to FIG. 2, in various embodiments, a lighting fixture 10 may further comprise a decorative light shade 12. In various embodiments, the light shade 12 may be used to hide the socket 14 and cover 13 from view from at least some lines of sight. In various embodiments, the light shade 12 may be configured to provide an aesthetically pleasing appearance to lighting fixture 10.

In various embodiments, the decorative light shade 12 may function to add a decorative appearance to the lighting fixture 10 and may hide the socket 14 and cover 13 from direct view at least along some lines of sight to the socket 14. In some embodiments, the light shade 12 may hide the socket 14 and/or cover 13 from direct view along various lines of sight accounting for less than $\pi/2$ sr of the solid angle about the socket 14 and/or the cover 13. In various embodiments, the light shade 12 may hide the socket 14 and/or cover from direct view along various lines of sight accounting for $\pi/2$ to $\pi$ sr of the solid angle about the socket 14 and/or the cover 13. In other embodiments, the light shade 12 may hide the socket 14 and/or cover from direct view along various lines of sight accounting for $\pi$ to $2\pi$ sr of the solid angle about the socket 14 and/or the cover 13. In yet other embodiments, the light shade 12 may hide the socket 14 and/or cover from direct view along various lines of sight accounting for $2\pi$ to $3\pi$ sr of the solid angle about the socket 14 and/or the cover 13. In certain embodiments, the light shade 12 may hide the socket 14 and/or cover 13 from direct view along nearly every line of sight to the socket 14. Thus, in various embodiments, the decorative light shade 12 may be a variety of shapes. Also, in various embodiments, the decorative light shade 12 may be a variety of sizes relative to the lighting fixture 10.

In various embodiments, the decorative light shade 12 may be configured to permit at least some portion of the light incident upon the light shade 12 to pass through light shade 12. In other embodiments, the decorative light shade 12 may be configured to not permit a portion of the light incident upon the light shade 12 to pass through light shade 12, as may be appropriate for various applications. In some such embodiments, the inside surface of the decorative light shade may be made of a reflective material or coated with a reflective material such that at least a portion of the light incident upon the inside surface of the light shade 12 is reflected. In various such embodiments, the light reflected off the inside surface of light shade 12 may be reflected such that the light is directed toward one or both of the first and second opening of the light shade 12, if one or both of such openings are present.

In various embodiments the decorative light shade 12 may be made of glass, plastic, alabaster, fabric, metal, or any other appropriate material or combination of suitable materials. In various embodiments, the decorative light shade 12 may be made out of more the one material. For example, in some embodiments, a light shade 12 may be constructed by covering a metal frame with fabric, as commonly known in the art. In other embodiments, decorative light shades 12 may be made out of a variety of appropriate materials.

In various embodiments, the material of light shade 12 may be configured to not permit light incident upon the light shade to pass through the light shade 12. In various such embodiments, the light emitted by the one or more LEDs 16 may be emitted by the lighting fixture through the solid angle about the cover 13 not blocked by the decorative light shade 12. In certain such embodiments, the material of the light shade may be configured to permit less than 10% of the light incident upon the light shade 12 to pass through the light shade 12. In other embodiments, the material of the light shade 12 may be configured to permit at least a portion of the light incident upon it to pass through the decorative light shade. In certain such embodiments, the material of light shade 12 is configured to permit at least 10% of the incident light to pass through light shade 12. In various embodiments, the material of light shade 12 may be configured to permit a significant fraction of incident light to pass through decorative light shade 12. In certain embodiments, the material of light shade 12 may be configured to allow at least 40%, 50%, or 60% of the incident light to pass through light shade 12. In some embodiments, the material of light shade 12 is configured to permit nearly all of the incident light to pass through the light shade 12. In certain embodiments, the material of light shade 12 is configured to permit at least 80% or 90% of the incident light to pass through light shade 12.

In various embodiments, a decorative light shade 12 may comprise a first opening. In various such embodiments, the light shade 12 may further comprise a second opening. However, in some embodiments, the light shade 12 may not comprise a second opening. In some embodiments, the light shade 12 may further comprise at least one door which may be used cover the first and/or second opening in the light shade 12. In some embodiments, a door may be hingedly or selectively removably connected to light shade 12. For example, in some embodiments, a door may be connected to light shade 12 by Velcro, snaps, zippers, magnets, selectively removable adhesive, or other suitable mechanisms.

In various embodiments the light shade 12 may be slid onto a socket 14 via the first opening in light shade 12. In various embodiments, the socket 14 may be accessed through a second opening in light shade 12. In some embodiments, the socket 14 may be accessed via a door in light shade 12. In various embodiments, the access to socket 14 may be used to operably mount a cover 13 to the socket 14. In some such embodiments, the cover 13 may be used to secure the light shade 12 to the socket 14.

In various embodiments, a decorative light shade 12 may be secured to the fixture mounting 11 by sliding light shade 12 onto the socket 14 and then operably mounting the cover 13 to the socket 14. In other embodiments, light shade 12 may be secured to the fixture mounting 11 at least in part by cover 13 in addition to other appropriate mechanisms. In various embodiments, the decorative light shade 12 may be in part secured to the lighting fixture 10 by a light shade seat 111. In other embodiments, the decorative light shade 12 may be in contact with a light shade seat 111. In still other embodiments, when the light shade 12 is secured to the lighting fixture 10, the light shade 12 may apply some pressure to a light shade seat 111. In certain embodiments, light shade 12 may engage in some manner with light shade seat 111. In other embodiments, the light shade 12 may not be in physical contact with a light shade seat 111.

As described above and illustrated in FIGS. 4-6, various embodiments of the lighting fixture 10 may comprise more than one socket 14. In various such embodiments, a decorative light shade 12 may be secured to each socket 14. In some embodiments, a light shade 12 may be secured to at least one socket 14. In other embodiments, no decorative light shades 12 may be used. In various embodiments, a light shade 12 may be configured to correspond to one socket 14. In other embodiments, a light shade 12 may be configured to correspond to more than one socket 14. In various embodiments, each light shade 12 is secured to one or more sockets 14 by a cover 13. In some embodiments, each light shade 12 is secured to each socket 14 to which it corresponds by a cover 13. Thus, in various embodiments in which a light shade 12 corresponds to a plurality of sockets 14, a cover 13 which also corresponds to a plurality of sockets 14 may be used to secure light shade 12 to the plurality of sockets 14. In other such embodiments, a plurality of covers 13 may be used to secure light shade 12 to each or at least one of the plurality of sockets 14. In other embodiments, decorative light shade 12 may be secured to the more than one socket 14 by some other suitable mechanism. In certain embodiments, lighting fixture 10 does not comprise a decorative light shade 12. Of course it should be understood that any of a variety of alternatives commonly known and understood in the art may be employed without departing from the scope of the invention.

7. Cover 13

Returning to FIG. 2, various embodiments of the lighting fixture 10 may comprise at least one cover 13. In various embodiments, cover 13 may be configured to secure the cover 13 to a socket 14. In some embodiments, cover 13 is configured to operatively mount the cover 13 and the decorative light shade 12 to a socket 14. Also, in various embodiments, cover 13 may be configured to disperse the light emitted by the at least one LED 16.

In various embodiments, the cover 13 may be configured to permit at least a portion of the light emitted by the at least one LED 16 and incident upon the cover 13 to pass through the cover 13. In various such examples, the cover 13 may be configured to permit at least 10% or 25% of the light incident upon it to pass through the cover 13. In some embodiments, the cover 13 may be configured to allow a significant portion of the light incident upon it to pass through the cover 13. In certain embodiments, the cover may be configured to permit 10-30%, 30-50%, or 50-80% of the light incident upon it to pass through the cover 13. In other certain embodiments, the cover 13 may be configured to permit at least 50% or 60% of the light incident upon it to pass through the cover 13. In still other embodiments, the cover may be configured to permit nearly all the light incident upon it to pass through the cover. In certain such embodiments, the cover 13 may be configured to permit 80% or 90% of the light incident upon it through the cover 13.

In various embodiments, the cover 13 may be made of glass. In other embodiments, the cover 13 may be made from a polymerized material, as commonly known and understood in the art. In certain embodiments, the cover 13 may be made out of plastic. In still other embodiments, the cover 13 may be made of any other suitable material. In various embodiments, the cover 13 may be made of any suitable translucent or semi-translucent material. In some embodiments, the cover 13 may be made out of clear or frosted material. In certain embodiments, the cover 13 may be made out of smart glass or some other material that can transition from clear to frosted and/or vice versa. In certain embodiments, the cover may in part or in whole be made of an opaque material, if appropriate for the application.

In various embodiments, the cover 13 may be made out of one material. In other embodiments, the cover 13 may, at least in part, part be made out of more than one material. In various such embodiments, one or more materials may be used for specific parts of the cover 13 to enhance the ability of the cover 13 to secure the cover 13 and/or the decorative light shade 12 to the socket 14. In other embodiments, one or more materials may be used to enhance the ability of the cover 13 to disperse light emitted by the at least one LED 16 and incident upon the cover 13. In still other embodiments, one or more materials may be used to enhance the aesthetic appearance of the cover 13 or to achieve engineering goals such as weight of, cost of manufacturing of, or other engineering goals for the cover 13.

In various embodiments, the translucent or semi-translucent material may be configured to permit at least a portion of the light incident upon the cover 13 to pass through the cover. In some such embodiments, the translucent or semi-translucent material may be configured to permit at least 10% or 20% of the light incident upon the cover 13 to pass through the cover. In other embodiments, the translucent or semi-translucent material may be configured to permit a significant fraction of the light incident upon the cover 13 to pass through the cover. In certain embodiments, the translucent or semi-translucent material may be configure to permit 10-30%, 30-50%, or 50-80% of the light incident upon the cover 13 to pass through the cover. In still other embodiments, the translucent or semi-translucent material may be configured to permit nearly all the light incident upon the cover 13 to pass through the cover. In certain embodiments, the translucent or semi-translucent material may be configured to permit at least 80% or 90% of the light incident upon the cover 13 to pass through the cover.

In various embodiments, the cover 13 may be generally circular or elliptical in cross-section. In other embodiments, the cover 13 may be generally rectangular or alternatively shaped in cross-section. In various embodiments, the shape of the cross-section of the cover 13 may be different at one point along the length of the cover 13 than at another point along the length of the cover 13.

In various embodiments, the inside diameter of at least a portion of the cover 13 is substantially the same as the outer diameter of the socket 14. In other embodiments, the inside diameter of at least a portion of the cover 13 may be substantially different from the outer diameter of the socket 14. In still other embodiments, the outer diameter of at least a portion of the cover 13 may be substantially the same as the inner diameter of the socket 14. In yet still other embodiments, the outer diameter of at least a portion of the cover 13 may be substantially different from the inner diameter of the socket 14. Of course, in some of these and still other embodiments, the diameter of the cover 13 may be different at various points along the length of the cover 13. As may be desirable, in still other embodiments, the diameter of the cover 13 may be substantially the same at all points along the length of the cover 13.

In various embodiments, the length of the cover 13 may be chosen as appropriate for the application. In various embodiments, the cover 13 may be less than half an inch in length. In some embodiments, the cover 13 may be half an inch to an inch in length. In other embodiments, the cover 13 maybe one to three inches in length. In still other embodiments, the cover 13 may be three to six inches in length. In yet other embodiments, the cover 13 may be longer than six inches.

As illustrated in FIGS. 3A, 6-7, 10, and 12, in various embodiments, the cover 13 may include a neck portion 132 and/or an enclosing portion 133. In various embodiments, the neck portion 132 and the enclosing portion 133 may be made out of the same material. In other embodiments, the neck portion 132 and the enclosing portion 133 may be made of different materials.

In various embodiments, the cover 13 may comprise a neck portion 132 configured to engage the socket 14 and/or other elements of lighting fixture 10. Thus, in some embodiments, the neck portion 132 may comprise threads disposed on the inside or outside surface of neck portion 132. In other embodiments, the neck portion 132 may comprise one or more tabs disposed on the inside or outside surface of the neck portion 132. In still other embodiments, the neck portion 132 may be configured such that the neck portion may expand and contract or stretch and be tightened. In yet other embodiments, neck portion 132 may comprise some other mechanism that may be configured to engage socket 14 and/or other elements of lighting fixture 10.

Figure 12:
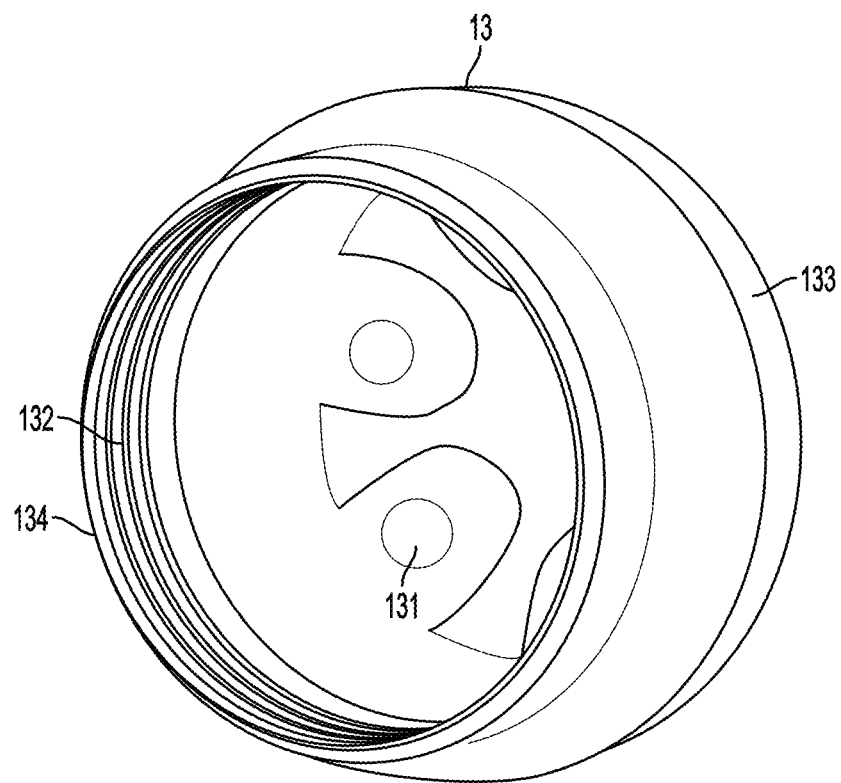
FIG. 12 is a perspective view of a cover, according to various embodiments of the present invention.

As shown in FIG. 12, in various embodiments, the neck portion 132 may further comprise an approximately flat lip 134 configured to engage the decorative light shade 12. In some embodiments, the lip 134 may be used to operatively secure and/or retain and/or immobilize the light shade 12 onto and/or relative to the socket and/or the light shade seat 111. In various embodiments, the lip 134 is about one-sixteenth to one-eighth of an inch wide. In other embodiments, the lip 134 is approximately one-eighth to one-quarter of an inch wide. In still other embodiments, the lip 134 is about one-quart to half of an inch wide. In still other embodiments, the lip 134 may be half an inch to one inch wide.

In various embodiments, cover 13 may further comprise an enclosing portion 133. The enclosing portion 133 may be globe-shaped, bulb-shaped, dome-shaped, or flame-shaped, in various embodiments. In other embodiments, the enclosing portion 133 may be cylindrically or alternatively shaped. In various embodiments, the enclosing portion 133 may fully enclose one end of the neck portion 132. In other embodiments, the enclosing portion 133 may comprise one or more holes disposed within the surface of the enclosing portion 133.

In some embodiments, the outer surface of the enclosing portion 133 may be smooth. In other embodiments, the outer surface of the enclosing portion 133 may have some texture. In various such embodiments, the interior surface of the enclosing portion 133 may be smooth, have a texture which corresponds with the exterior texture, or have a texture which does not correspond with an exterior texture. In various embodiments, the outer surface of enclosing portion 133 may be smooth while the interior surface of enclosing portion 133 is textured or vice versa. In other embodiments, the outer and interior surfaces of the enclosing portion 133 may both be smooth or both be textured. In the at least one embodiment illustrated in FIGS. 3A-B, 6-7, 10, and 12, the enclosing portion 133 includes one or more nodules 131, as viewed from the outer surface. In various embodiments, the nodules 131 may protrude outward relative to the outer surface of the enclosing portion 133. In some such embodiments, the one or more nodules 131 may appear as dimples when viewed from the inner surface of the enclosing portion 133.

Figure 3A:
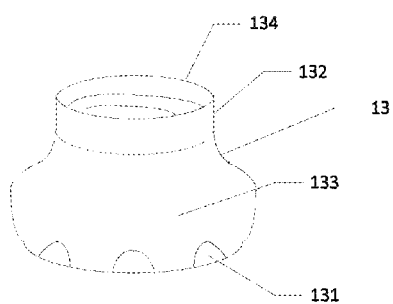
FIG. 3A is a side view of a cover, according to various embodiments of the present invention.
Figure 3B:
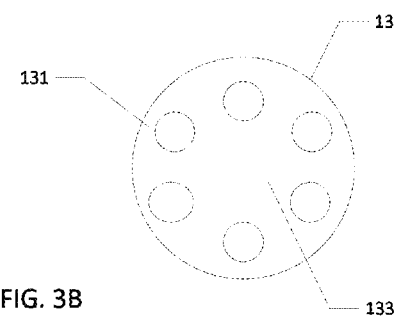
FIG. 3B is a front view of a cover, according to various embodiments of the present invention.

As shown in FIG. 3B, in various embodiments, the enclosing portion 133 may include six nodules 131 arranged such that they are placed at equidistance from each other around the outer edge of the front surface of the enclosing portion 133. In other embodiments, a different number of nodules 131 may be used, such as the non-limiting examples of four or eight nodules 131. In various embodiments, the nodules 131 may have a generally circular or elliptical cross-section. In other embodiments, nodules 131 may have a generally rectangular or alternatively shaped cross-section. In various embodiments, the nodules 131 may not be evenly distributed around the outer edge of the enclosing portion 133 or about a perimeter of the enclosing portion.

Still further, in some embodiments, one or more nodules 131 may be disposed in the central region of the surface of the enclosing portion 133. Various embodiments wherein the cover 13 comprises one or more nodules 131 may also comprise additional texture on the surface of the cover 13. In other embodiments wherein the cover 13 comprises one or more nodules 131 the surface of the cover 13 may be smooth other than the presence of the nodules 131. In various embodiments, the surface of the cover 13 and the surface of the nodules 131 may be both be smooth or both be textured. In other embodiments, the surface of the cover 13 may be textured and the surface of the nodules 131 may be smooth or vice versa. In some embodiments, the nodules 131 may be made of the same material as the enclosing portion 133. In other embodiments, the nodules 131 may be made of a different material than the enclosing portion 133.

In various embodiments wherein cover 13 comprises one or more nodules 131, the one or more nodules 131 may be of various sizes. In various embodiments, nodules 131 have a diameter of approximately 1 mm. In other embodiments, the diameter of the one or more nodules 131 may be 1-5 mm or 5-10 mm. In still other embodiments, the diameter of the one or more nodules 131 may be 10-25 mm. In yet other embodiments, the diameter of the one or more nodules 131 may be 1 cm or less. In various embodiments, the nodules 131 may have a height of less than 2 mm. In other embodiments, the nodules 131 may have a height of 2-5 mm. In still other embodiments, the nodules 131 may have a height of 5-10 mm. In yet other embodiments, the nodules 131 may have a height of 1 cm or less. In some embodiments, the one or more nodules 131 of a given embodiment may be different sizes. In other embodiments, the one or more nodules 131 of a given embodiment may be substantially the same size.

According to various embodiments, the nodules 131 may be configured as dimples, recesses, protrusions, or the like, as may be generally desirable for a particular application, without being limited to the specific nodular configuration described previously herein. In this regard, the nodules 131 may be alternatively configured in this fashion, however as may be desirable for particular applications.

In various embodiments the at least one cover 13 may be secured to the at least one socket 14. In some embodiments, the neck portion 132 of cover 13 may be used to engage a socket 14. In other embodiments, other mechanisms may be used to operatively mount cover 13 onto socket 14. In some such embodiments, the cover 13 may secure at least one decorative light shade 12 to the at least one socket 14. In various embodiments, the cover 13 may disperse light emitted by the at least one LED 16. In various such embodiments, it may appear that the light source of the lighting fixture 10 is located within the cover 13. In some such embodiments, the cover 13 may be used to make it appear that the decorative light shade 12 is being illuminated by a light source more centrally located within the decorative light shade 12 than the actual location of the at least one LED 16.

In various embodiments, the portion of the locking mechanism disposed on the cover 13 may be disposed on the neck portion 132. In various embodiments, the neck portion 132 may be threaded on the inside or outside surface. The threads disposed on the neck portion 132 may be configured to engage threads that may be present on the outer or inner surface of socket 14. Thus, in these embodiments, the cover 13 may be screwed onto the socket 14. Therefore, in these embodiments, the threads disposed on the cover 13 and the socket 14 lock the cover into place with respect to the socket and allow for easy removal and replacement of the cover if needed or desired.

In some such embodiments, the neck portion 132 may be configured to expand and contract such that the neck portion may be expanded to fit over socket 14 and then contracted or tightened about socket 14, thus securing the cover 13 to socket 14. In other embodiments, the neck portion 132 may comprise a tab that may rotationally engage a groove located on a surface of the socket 14 and thus securing the cover 13 to socket 14. In other embodiments, other suitable mechanisms may be used to lock the cover 13 onto the socket 14. In various embodiments, at least some portion of the neck portion 132 may be configured to engage the decorative light shade 12. In some such embodiments, the cover 13 may be used to operatively mount the light shade 12 onto socket 14. In various such embodiments, the lip 134 may engage the light shade 12 in order to operatively secure and/or retain and/or immobilize the light shade 12 onto and/or relative to the socket 14 and/or the light shade seat 111. In some embodiments, the cover 13 may be configured to engage light shade seat 111.

In various embodiments, the enclosing portion 133 is configured to disperse light emitted by the at least one LED 16. In various such embodiments, the enclosing portion 133 may be configured to give the appearance that the light source of the lighting fixture 10 is located within the cover 13. In some such embodiments, the enclosing portion 133 may be configured to give the appearance that the decorative light shade 12 is being illuminated by a light source more centrally located within the decorative light shade 12 than the actual location of the at least one LED 16.

In various embodiments, the cover 13 is configured to disperse the light emitted by the at least one LED 16. In some embodiments, the at least one LED 16 may be secured within socket 14 such that the top of the at least one LED 16 is recessed within socket 14. In various such embodiments, the cover 13 may be configured to make it appear that the light source of lighting fixture 10 is recessed within decorative light shade 12 but not recessed within socket 14. Some users may find that this increases the aesthetic quality of lighting fixture 10. In some such embodiments, the cover 13 may be configured to give an appearance that may be similar to that of a lighting fixture comprising an incandescent light bulb.

In various embodiments, at least a portion of the outer and or inner surface of the cover 13 may be textured and/or be comprised of one or more nodules 131. In various such embodiments, the aforementioned texture and/or nodules may affect the light dispersion qualities of the cover 13. In some embodiments, the texture and/or nodules may increase the dispersion of light emitted by the at least one LED 16 and incident upon the cover 13. In other embodiments, any texture and/or nodules on the cover may merely be present for aesthetic purposes. In still other embodiments, the surfaces of the cover 13 may not be textured and/or dimpled, but may still be configured to disperse light emitted by the at least one LED 16.

In various embodiments, the various other components of the light fixture 10 may be combined with the cover 13. In some embodiments, one component may act as the cover 13 and the shield 15. In other embodiments, one component may act as the cover 13 and the decorative light shade 12. Thus, in various embodiments, other components of the lighting fixture 10 may be structurally incorporated into the cover 13. In other embodiments, the cover 13 may be structurally distinct from the other components of lighting fixture 10.

As noted above, in various embodiments, the cover 13 may be secured to the socket 14. In some embodiments, the cover 13 may be used to secure decorative light shade 12 to socket 14. In other various embodiments, the cover 13 may be secured directly to the fixture mounting 11. In other embodiments, the cover 13 may be secured to the light shade seat 111. In some embodiments, the cover 13 may be used to secure the decorative light shade 12 directly to the fixture mounting 11. In still other embodiments, the cover 13 may be used to secure the light shade 12 to the light shade seat 111.

In various embodiments, the cover 13 may not be comprised of a neck portion 132 and an enclosing portion 133. In such embodiments, the cover may still be configured to operatively mount the cover 13 and/or the decorative light shade 12 to the socket 14 or other component of lighting fixture 10. In various embodiments, the cover 13 may still be configured to give the appearance that the light source of the lighting fixture 10 is located within the cover 13. In some such embodiments, the cover 13 may be configured to give the appearance that the decorative light shade 12 is being illuminated by a light source more centrally located within the decorative light shade 12 than the actual location of the at least one LED 16. In some embodiments, the outer and/or inner surface of the cover 13 may be smooth, at least in part. In other embodiments, the outer and/or inner surface of the cover 13 may be textured and/or include one or more nodules 131, at least on some portion thereof.

As previously discussed herein and illustrated in FIGS. 4-6, various embodiments of the lighting fixture 10 may comprise more than one socket 14. In various such embodiments, a cover 13 may be secured to each socket 14. In various embodiments, a cover 13 may be configured to correspond to one socket 14. In other embodiments, a cover 13 may be configured to correspond to more than one socket 14. In various embodiments, each cover 13 is secured to one or more sockets 14, either via threads disposed on the inner surface of the cover 13 that are configured to mate with threads on the outer surface of the socket 14 or by some other suitable mechanism.

In various embodiments, a cover 13 may be used to secure a decorative light shade 12 to each socket 14. In some embodiments, a cover 13 is configured to secure an independent light shade 12 to each socket 14. In other embodiments, a cover 13 may be configured to secure a single light shade 12 to more than one socket 14. In still other embodiments, more than one cover 13 may be used to secure a single light shade 12 to more than one socket 14.

Exemplary Methods of Installing Various Embodiments

Methods of installing various embodiments light fixture 10 will now be discussed. First, an exemplary method of installing various embodiments of a "floor-style" lighting fixture, such as that illustrated in FIGS. 1 and 2 shall be discussed. Second, an exemplary method of installing various embodiments of a "wall-style" light fixture, such as that illustrated in FIGS. 5 and 6 will be detailed. Of course it should be understood that numerous variations to the described methods may be implemented, without departing from the scope and nature of the present invention.

In various embodiments, a floor style lighting fixture, such as that illustrated in FIG. 2, may be provided. The fixture mounting 11 may be placed on an approximately horizontal surface, such as a floor, a patio, a deck, the ground, a table, or a similar surface. In various such embodiments, the at least one LED 16 may be mounted on a board 161. Any necessary or desired driver circuitry may also be mounted on the board 161. Once the fixture mounting 11 is placed on an appropriate surface, the at least one LED 16 may be operatively mounted within the socket 14 of fixture mounting 11. The board 161 may rest on a seat within the socket 14 and/or may be secured with set screws, an appropriate adhesive, or other suitable mechanism, in various embodiments, as has been described previously herein. The shield 15 may be placed in or on the socket 14 on top of the at least one LED 16. The shield may also, in certain embodiments, be secured with set screws, an appropriate adhesive, or other suitable mechanism.

In various embodiments, the at least one LED 16 and shield 15 may be mounted in socket 14 in a factory setting. In such embodiments, the user may not need to complete the steps of operatively mounting the at least one LED 16 in the socket 14 and securing the shield 15 into or onto the socket. In other embodiments, the at least one LED 16 may be pre-mounted in socket 14 but the user may complete the step of mounting the shield 15 into or onto the socket.

In various embodiments, decorative light shade 12 may then be slid onto socket 14. Then, in various embodiments, cover 13 may be mounted onto the socket, locking the light shade 12 onto the socket. In some embodiments, cover 13 may be screwed onto socket 14 such that threads disposed on a surface of the socket mate with threads on a surface of the cover. In some such embodiments, the threads of cover 13 may be located on an inside surface of the neck portion 132 of cover.

In other embodiments, a wall style lighting fixture, such as that illustrated in FIG. 6 is provided. In such embodiments, the fixture mounting 11 must be mounted to an appropriate surface, such as an interior or exterior wall. Other embodiments may be configured to be mounted on a ceiling. In some embodiments, at least one LED 16 may already be operatively mounted in each socket 14. In other embodiments, the user may operatively mount at least one LED 16 in each socket 14 with set screws, an appropriate adhesive, or other mechanism, as may be commonly known and used in the art. In various embodiments, a shield 15 may already be secured in or on each socket 14. In other embodiments, the user may secure a shield 15 in or on each socket 14 on top of the at least one LED 16 via set screws, an appropriate adhesive, or other mechanisms.

In various embodiments, a decorative light shade 12 may be slid onto the first socket 14. A cover 13 may then be mounted onto the first socket 14, in various embodiments. In some such embodiments, mounting the cover 13 onto the socket 14 will likewise operatively secure and/or retain and/or immobilize the light shade 12 onto and/or relative to the socket 14. In other embodiments, the decorative light shade 12 may be slid onto the first socket 14 and engaged in some manner with the light shade seat 111. In various such embodiments, the cover 13 may be mounted onto the socket 14 to additionally operatively secure and/or retain and/or immobilize the light shade 12 onto and/or relative to the socket. In still other embodiments, mounting the cover 13 and engaging other mechanisms may operatively secure and/or retain and/or immobilize the light shade 12 onto and/or relative to the socket.

According to various embodiments, for example those involving a wall-style or vanity mounted fixture, a second decorative light shade 12 may be slid onto a second socket 14, upon installation of a first decorative light shade 12 onto a first socket 14. A second cover 13 may then be likewise mounted on the second socket 14, in various embodiments. In this manner, the second decorative light shade 12 may be secured to the second socket 14 via the second cover 13. It should be understood from this disclosure that, according to various embodiments, the steps of sliding a light shade 12 onto a socket 14 and mounting a cover 13 onto the socket 14 may be repeated until all the sockets 14 of a particular fixture have decorative light shades 12 secured thereon, as may be desirable for particular applications.

CONCLUSION

Many modifications and other embodiments of the invention set forth herein will come to mind to one skilled in the art to which these inventions pertain having the benefit of the teachings presented in the foregoing descriptions and the associated drawings. Therefore, it is to be understood that the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A light emitting diode (LED) lighting fixture comprising:
   at least one socket comprising a peripheral wall, said peripheral wall having an external surface and an internal surface, said internal surface defining a socket opening;
   at least one LED recessed at least in part within an interior of said socket opening;
   at least one shield member positioned adjacent said at least one socket such that a perimeter of said at least one shield member is positioned adjacent said peripheral wall so as to substantially enclose said socket opening;
   at least one decorative light shade;
   at least one cover comprising a neck portion having an external surface and an internal surface, at least a portion of said internal surface defining a cover opening, wherein:
      said cover opening is configured to receive therethrough at least a portion of said at least one socket, such that said internal surface of said neck portion substantially engages said external surface of said peripheral wall;
      at least a portion of said cover is configured to substantially engage said decorative light shade; and
      at least a portion of said cover is configured to substantially enclose said at least one LED and said at least one shield member.

2. The LED lighting fixture of claim 1 wherein said at least one shield member is operatively mounted to said at least one socket.

3. The LED lighting fixture of claim 1 wherein said at least one shield member is operatively mounted to said peripheral wall of said at least one socket.

4. The LED lighting fixture of claim 1 wherein
   said external surface of said peripheral wall of said at least one socket comprises a first set of threads;
   said internal surface of said neck portion of said at least one cover comprises a second set of threads; and
   said first and second sets of threads configured such that said cover may be operatively mounted to at least one of said at least one socket at least in part by engaging said first set of threads with said second set of threads.

5. The LED lighting fixture of claim 1 wherein said neck portion further comprises a substantially flat lip between said external and internal surfaces wherein said lip is configured to substantially engage said decorative light shade.

6. The LED lighting fixture of claim 1 wherein said lip of said neck portion operatively secures said at least one light shade onto said at least one socket.

7. The LED lighting fixture of claim 1 wherein said cover further comprises an enclosing portion operatively connected to said neck portion opposite said cover opening and configured to disperse light emitted by said at least one LED.

8. The LED lighting fixture of claim 7 wherein said enclosing portion further comprises one or more nodules.

9. The LED lighting fixture of claim 8 wherein said one or more nodules consists of six nodules.

10. The LED lighting fixture of claim 8 wherein said nodules are evenly spaced about a perimeter of said enclosing portion.

11. The LED lighting fixture of claim 1 wherein said at least one LED is an AC driven LED.

12. The LED lighting fixture of claim 1 wherein said shield is a substantially planar electrical insulator configured to electrically and physically isolate said at least one LED from a user.

13. The LED lighting fixture of claim 1 wherein said lighting fixture is a wall style lighting fixture.

14. The LED lighting fixture of claim 1 wherein:
said at least one socket comprises at least two sockets;
said at least one LED comprises at least two LEDs wherein at least one LED is positioned within each of said at least two sockets; and
said at least one cover comprises at least two covers wherein one cover is secured to each of said at least two sockets.

15. The LED lighting fixture of claim 1 further comprising a fixture mounting wherein said at least one socket is secured to said fixture mounting.

16. The LED lighting fixture of claim 15 wherein said fixture mounting is configured to be mounted on a wall.

17. The LED lighting fixture of claim 15 wherein said fixture mounting is configured to rest on an approximately horizontal surface.

18. The LED lighting fixture of claim 1 wherein said neck portion is further configured to immobilize at least one of said at least one decorative light shade with respect to at least one of said at least one socket.

19. A light emitting diode (LED) lighting fixture comprising:
at least one socket comprising a socket opening defining an interior socket chamber of said at least one socket;
at least one LED recessed at least in part within said interior socket chamber;
at least one shield substantially secured within said interior socket chamber such that said at least one LED is substantially enclosed within said interior socket chamber by said shield; and
at least one cover comprising a cover opening, said cover opening defining an interior cover chamber of said at least one cover, said at least one cover being operatively mounted to said at least one socket such that at least one of said LEDs and at least one of said shields are positioned within at least a portion of said interior cover chamber opening.

20. The LED lighting fixture of claim 19 wherein said cover comprises:
a neck portion and an enclosing portion;
said neck portion configured to operatively mount said cover to at least one of said at least one socket; and
said enclosing portion configured to disperse the light emitted by at least one of said at least one LED.

21. The LED lighting fixture of claim 19 wherein:
said at least one socket having a threaded outer surface; and
said neck portion of said at least one cover having a threaded inner surface;
said threads configured such that said cover may be operatively mounted to at least one of said at least one socket in part via said threads positioned on said at least one socket and said threads positioned on said neck portion of said at least one cover.

22. The LED lighting fixture of claim 19 wherein said shield is a substantially planar electrical insulator configured to electrically and physically isolate said at least one LED from a user.

23. The LED lighting fixture of claim 19 further comprising at least one decorative light shade.

24. The LED lighting fixture of claim 23 wherein said at least one decorative light shade is operatively secured to said at least one socket by said at least one cover.

25. A vanity lighting fixture comprising:
two or more sockets each comprising a first opening defining an interior chamber of each of said two or more sockets;
two or more LEDs wherein at least one LED is recessed at least in part within said interior chamber of each of said two or more sockets;
two or more shields wherein each shield is positioned within said interior chamber of one of said two or more sockets such that said at least one LED is enclosed within said first chamber by said shield;
two or more covers each comprising a second opening defining an interior chamber of each of said two or more covers, said two or more covers each secured to one of said two or more sockets such that said at least one LED positioned within said one of two or more sockets is positioned within said second opening of one of said covers; and
two or more decorative light shades wherein each decorative light shade is secured to one of said two or more sockets via one of said two or more covers.

* * * * *